United States Patent [19]

Susnjara

[11] Patent Number: 4,748,867
[45] Date of Patent: Jun. 7, 1988

[54] WRIST ASSEMBLY FOR INDUSTRIAL ROBOTS

[75] Inventor: Kenneth J. Susnjara, Santa Claus, Ind.

[73] Assignee: Thermwood Corporation, Dale, Ind.

[21] Appl. No.: 853,663

[22] Filed: Apr. 18, 1986

[51] Int. Cl.⁴ .................... G05G 11/00; B25J 17/02
[52] U.S. Cl. ........................... 74/479; 248/278; 901/29
[58] Field of Search ............... 74/479; 248/278; 414/735; 623/61, 62; 901/22, 28, 29

[56] References Cited

U.S. PATENT DOCUMENTS 4,229,136 10/1980 Panissidi ..................... 901/22
4,300,362 11/1981 Lande et al. .................. 901/28 X

FOREIGN PATENT DOCUMENTS 422580 9/1974 U.S.S.R. ..................... 901/28
676441 7/1979 U.S.S.R. ..................... 901/28

Primary Examiner—Allan D. Herrmann
Attorney, Agent, or Firm—Lalos & Keegan

[57] ABSTRACT

A wrist assembly for an industrial robot comprising a base member mountable on an arm member of the robot, a carrier member mounted on the base member for pivotal movement about a first axis, a support member mounted on the carrier member for pivotal movement about a second axis intersecting the first axis whereby the support member is adapted to move universally relative to the base member, a first control rod having a base section operatively connectable to the robot for having motion along the length thereof imparted thereto and a linking section universally connected to the base section and connected to the support member, a second control rod having a base section operatively connectable to the robot for having motion along the length thereof imparted thereto and a linking section universally connected to the base section and connected to the support member, a third control rod having a base section operatively connectable to the robot for having rotational motion about its longitudinal centerline imparted thereto and a tool mounting section universally connected to the base member and mounted on the support member, and the pivotal center of the universal connection between the base and mounting sections of the third control rod coinciding with the intersection of the first and second axes.

14 Claims, 3 Drawing Sheets

WRIST ASSEMBLY FOR INDUSTRIAL ROBOTS

This invention relates to industrial robots and more particularly to a novel wrist assembly for an industrial robot.

One particular type of industrial robot used in the prior art generally consists of a support unit, a base unit mounted on the support unit rotatable about a vertical axis, a lower arm member mounted on the rotatable base unit for pivotal movement about a first horizontal axis, an upper arm member mounted on the upper end of the lower arm member for pivotal movement about a second horizontal axis, and a tool supporting unit universally connected to the upper arm member by means of a wrist assembly. Typical, such wrist assemblies have been complex in design, expensive to manufacture and not entirely satisfactory in performance. It thus has been found to be desirable to provide an improved wrist assembly for industrial robots.

Accordingly, it is the principal object of the present invention to provide an improved wrist assembly for an industrial robot.

Another object of the present invention is to provide an improved wrist assembly for an industrial robot which is capable of positioning a tool mounted on the end of the wrist assembly over a wide range of locations.

A further object of the present invention is to provide an improved wrist assembly for an industrial robot which is capable of positioning a tool mounted on the end of the wrist assembly at positions displaced at least 60° of the longitudinal centerline of the upper arm member on which the wrist assembly is mounted.

A still further object of the present invention is to provide an improved wrist assembly for an industrial robot which is capable of positioning a tool mounted on the end of the wrist assembly over a wide range of positions about three axes both rapidly and accurately.

Another object of the present invention is to provide an improved wrist assembly for an industrial robot which is simple in design, comparatively inexpensive to manufacture and highly effective in performance.

Other objects and advantages of the present invention will become more apparent to those persons having ordinary skill in the art to which the present invention pertains from the following description taken in conjunction with the accompanying drawings wherein.

Figure 1:
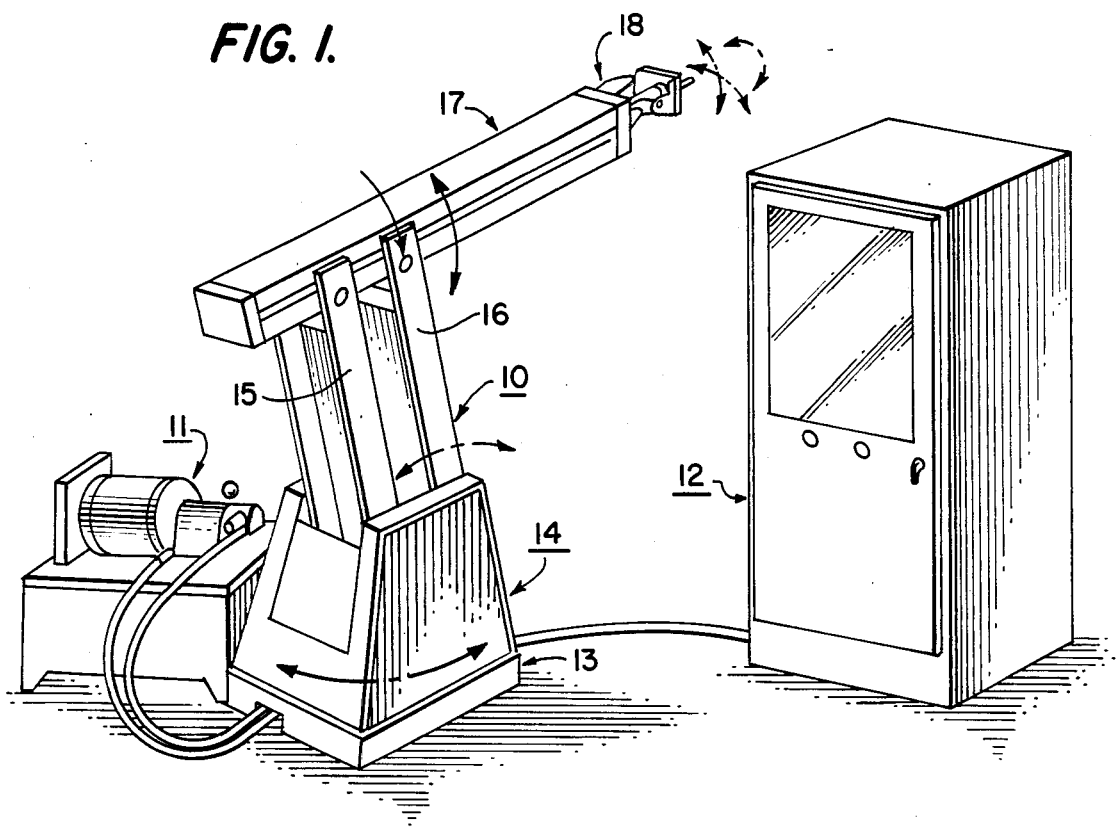
FIG. 1 is a perspective view of an industrial robot system utilizing the present invention.

Referring to FIG. 1, there is illustrated an industrial robot system for performing work functions on a workpiece which generally consists of a robot actuator 10, a source of hydraulic fluid under pressure 11 and a unit 12 for controlling the motions of the robot actuator. Generally, the robot consists of a stationary support unit 13, a base unit 14 mounted on the support unit and adapted to rotate about a vertical axis, a pair of lower sets of arm members 15 and 16 mounted at their lower ends to base unit 14 for pivotal movement about a pair of lower horizontal axes, an upper arm member 17 mounted on the upper ends of arm sets 15 and 16 for pivotal movement about a pair of upper horizontal axes, and a wrist assembly 18 mounted on a free end of the upper arm.

Figure 3:
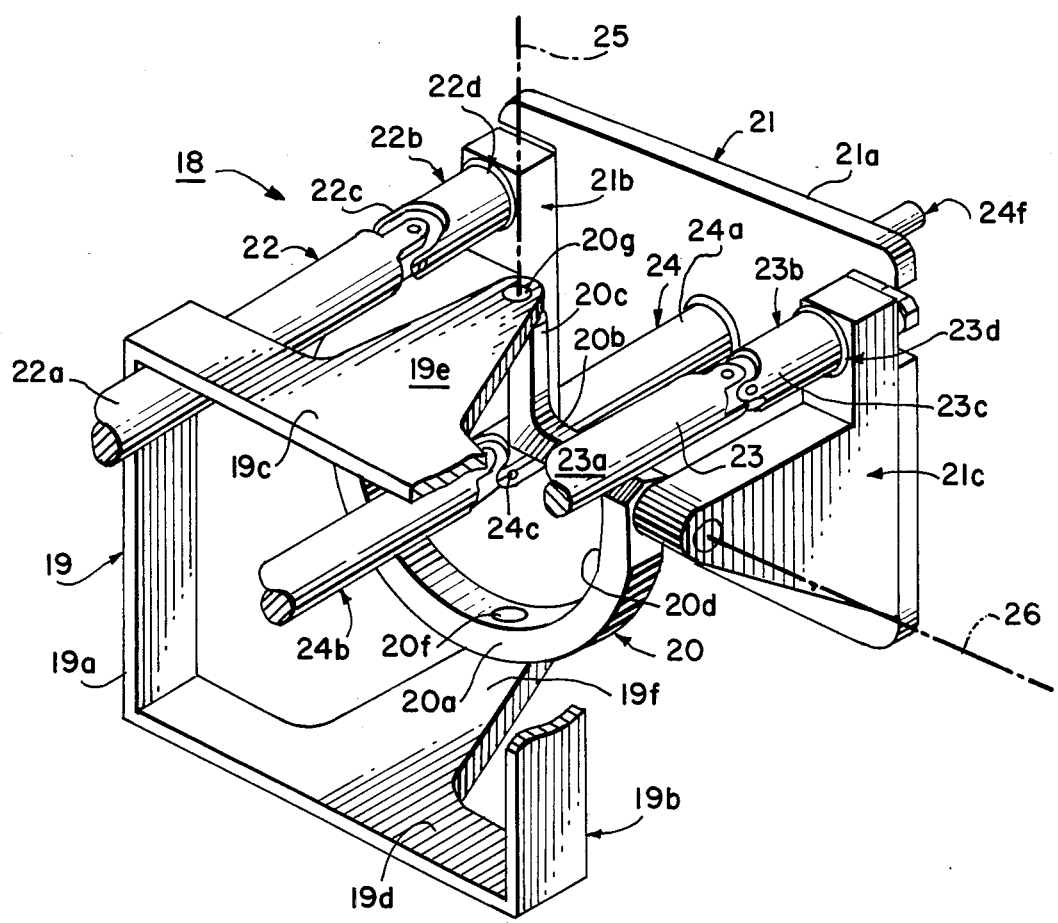
FIG. 3 is an enlarged perspective view of the wrist assembly shown in FIGS. 1 and 2, embodying the present invention.

As best seen in FIG. 3, wrist assembly 18 consists of a base member 19, a carrier member 20, a support member 21 and control rod members 22, 23 and 24. Base member 19 includes a pair of side sections 19a and 19b and upper and lower sections 19c and 19d which are adapted to be rigidly mounted on an upper, free end of arm member 17. Upper and lower sections 19c and 19d are provided with forwardly projecting portions 19e and 19f which support the carrier member.

Carrier member 20 is mounted on base member portions 19e and 19d for pivotal movement about an axis 25. It includes a lower, arcuate section 20a pivotally connected to base member portion 19f as at 20f, a pair of inwardly projecting sections 20b disposed below control rods 22 and 23 and an upwardly projecting portion 20c which is pivotally connected to base member section 19e as at 20g. The carrier member provides an opening 20d for receiving control rod member 24 therethrough.

Support member 21 includes a plate section 21a and a pair of bracket sections 21b and 21c which are mounted on the upper ends of arcuate section 20a of the carrier member for pivotal movement about an axis 26 which is disposed perpendicular to axis 25.

Control rod member 22 consists of a base section 22a and a linking section 22b. Linking section 22b is connected to base section 22a by means of a universal connection 22c and is mounted in a bearing 22d provided in bracket section 21b of the support member in a manner whereby linear motion may be transmitted from control rod member 22 to support member 21 while support plate 21 is permitted to rotate relative to linking section 21b about a longitudinal axis thereof.

Control rod member 23 is similar in construction and function to control rod member 22. It includes a base section 23a and a linking section 23b connected to base section 23a by means of universal connection 23c and journalled in bearing 23d in bracket section 21c.

Figure 2:
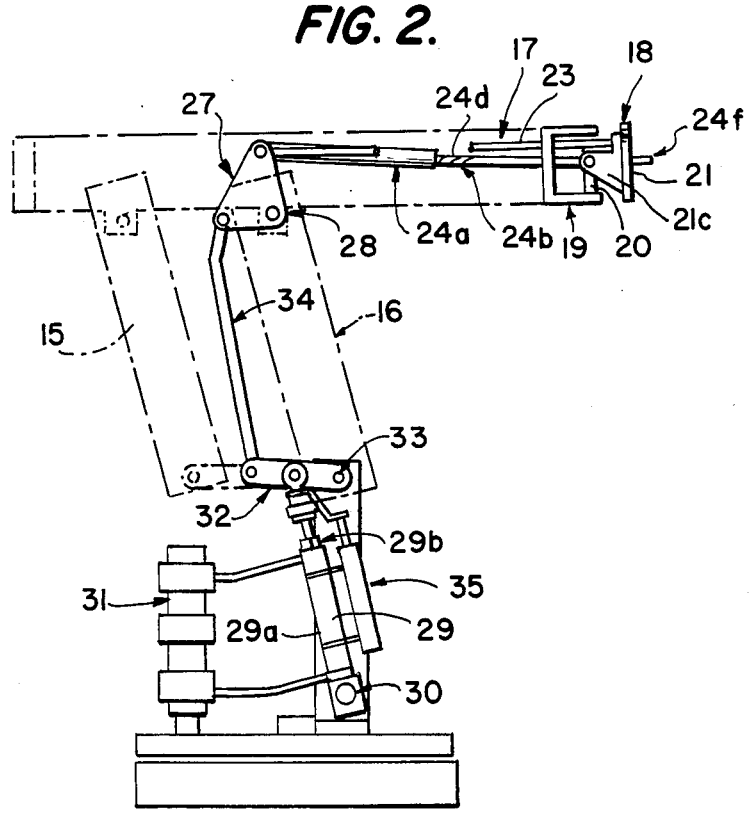
FIG. 2 is a side elevational view of the robot shown in FIG. 1, having portion thereof broken away.

Referring to FIGS. 2 and 3, control rod 24 consists of a base section 24a, an intermediate section 24b and a mounting section 24c. Base section 24a is disposed within the interior of arm member 17 and is pivotally connected at its rearward end to a crank member 27 which in turn is pivotally mounted on lower arm members 16 as at 28. The forward end of base section 24a is formed with a longitudinally disposed bore provided with internal, helical grooves which mesh with a set of helical ridges 24d provided on the rearward portion of intermediate section 24b which is received within the bore of 24a. The cooperation between the helical ridges and grooves of base section 24a and intermediate section 24b is such that upon pivoting crank 27 to impart linear motion to base section 24a, such cooperation will translate the rectilinear motion of base section 24a to rotational motion of intermediate section 24b.

The forwardly disposed end of intermediate section 24b extends through base member 19 and carrier member 20 and is connected to mounting section 24c by means of a universal connection 24e. Mounting section 24c extends through and is journalled in an opening in plate section 21a of the support member, and is provided with a free end portion 24f on which there may be mounted a working tool such as a spraying gun.

As best seen in FIG. 3, control rod members 22 and 23 are disposed on opposite sides of pivot axis 25 and on the same side of pivot axis 26 so that upon simultaneously extending or retracting control rod members 22 and 23 the support member will be caused to pivot about axis 26, and upon extending one of such control rod members and retracting the other, the support member will be caused to pivot about axis 25. In addition, it will be seen that by imparting rectilinear motion to section 24a of control rod member 24, the tool mounted on end portion 24f will be caused to rotate.

The pivotal center of universal connection 24e coincides with the intersection of pivot axes 25 and 26 to permit the simultaneous extension and retraction of control rod members 22 and 23 and rotation of control rod member 24. Furthermore, it will be appreciated that the recessed upper portions of the carrier member and the beveling of the front and rear edges of sections 20b and 20c of the carrier member allow maximum angular displacement of the support member relative to the base member about pivot axis 25 without incurring interference of control rod members 22 and 23 by the carrier member.

The extension and retraction of control rod section 24a through crank arm 27 is provided by a hydraulic cylinder assembly 29 provided in the base member of the unit. The assembly includes a cylinder 29a pivotally mounted at its lower end as at 30 and connected to a hydraulic valve and manifold assembly 31, and a rod 29b pivotally connected to a lever 32 which is pivotally mounted on the base member as at 33. Motion is transmitted from lever 33 to crank arm 27 by means of a connecting link 34.

It will be appreciated that by supplying fluid under pressure to the opposite ends of cylinder 29a, the rod portion thereof will be caused to extend and retract to transmit motion to crank arm 27 which in turn transmits rectilinear motion to control rod section 24a. As previously mentioned, the rectilinear motion of rod section 24a is translated through the helical connection between sections 24a and 24b to rotary motion to rotate the workpiece mounted on the end of mounting section 24c.

Additional hydraulic cylinder assemblies and linkages similar to that shown in FIG. 1 are provided to transmit motion for actuating control rod members 22 and 23.

Power unit 11 is of a conventional, commercially available type, including an oil reservoir, motor, pump, filter and appropriate controls. The power unit supplies fluid under pressure to the robot actuator through valve and manifold assembly 38.

Control unit 12 includes a microprocessor computer which functions in the convention manner in comparing the actual positions of the working tool with the program positions, determining the position errors and correspondingly generating command signals to selected valves controlling the hydraulic cylinders for correcting the errors. The positions of the components of the robot are sensed by linear potentiometers 35 mounted directly on the hydraulic cylinder assemblies.

The computer may be programmed either by moving the robot through a sequence of motions as desired, or through other input means. In programming by physically moving the robot through a sequence of motions, the outer end of the upper arm member and the work tool support member of the wrist assembly are moved through a sequence of motions such as the motions required to spray paint a workpiece. Under such conditions, the various potentiometers of the robot generate a sequence of position signals which function to program the computer.

The system as described is capable of operating in different modes including point-to-point and continuous path modes, depending on the work function to be performed.

From the foregoing detailed description, it will be evident that there are a number of changes, adaptations and modifications of the present invention which come within the province of those persons having ordinary skill in the art to which the aforementioned invention pertains. However, it is intended that all such variations not departing from spirit of the invention be considered as within the scope thereof as limited solely by the appended claims.

I claim:

1. A wrist assembly for an industrial robot comprising a base member mountable on an arm member of said robot, a carrier member mounted on said base member for pivotal movement about a first axis, a support member mounted on said carrier member for pivotal movement about a second axis intersecting said first axis whereby said support member is adapted to move universally relative to said base member, a first control rod having a base section operatively connectable to said robot for having motion along the length thereof imparted thereto and a linking section universally connected to said base section and connected to said support member, a second control rod having a base section operatively connectable to said robot for having motion along the length thereof imparted thereto and a linking section universally connected to said base section and connected to said support member, a third control rod having a base section operatively connectable to said robot for having rotational motion about its longitudinal centerline imparted thereto and a tool mounting section universally connected to said base section and mounted on said support member, and the pivotal center of the universal connection of the base and tool mounting sections of said third control rod coinciding with the intersection of said first and second axes.

2. A wrist assembly according to claim 1 wherein said first and second axes are perpendicular.

3. A wrist assembly according to claim 1 wherein said first and second control rods are disposed on opposite sides of one of said axes.

4. A wrist assembly according to claim 1 wherein said first and second control rods are disposed on the same side of one of said axes.

5. A wrist assembly according to claim 1 wherein said first and second control rods are disposed on opposite sides of said first axis and on the same side of said second axis.

6. A wrist assembly according to claim 1 wherein each of said linking sections of said first and second control rods is adapted to rotate about its longitudinal centerline relative to said support member.

7. A wrist assembly according to claim 1 wherein said tool mounting section of said third control rod is journalled in said support member.

8. A wrist assembly according to claim 1 wherein said mounting section of said third control rod includes means for mounting a working tool.

9. A wrist assembly according to claim 1 wherein said third control rod projects through an opening in said carrier member.

10. A wrist assembly for an industrial robot comprising a base member mountable on an arm member of said robot, a carrier mounted on said base member for pivotal movement about a first axis, a support member mounted on said carrier for pivotal movement about a second axis intersecting said first axis whereby said support member is adapted to move universally relative to said base member, a first control rod having a base section operatively connectable to said robot for having motion along the length thereof imparted thereto and a linking section universally connected to said base section and connected to said support member, a second control rod member having a base section operatively connectable to said robot for having motion along the length thereof imparted thereto and a linking section universally connected to said base section and connected to said support member, a third control rod having a base section operatively connectable to said robot for having rectilinear motion imparted thereto and operative to translate said rectilinear motion into rotational motion and a tool mounting section universally connected to said base section and mounted on said support member, and the pivotal center of the universal section of the base and tool mounting sections of said third control rod coinciding with the intersection of said first and second axes.

11. A wrist assembly according to claim 10 wherein said first and second control rods are disposed on opposite sides of one of said axes.

12. A wrist assembly according to claim 10 wherein said first and second control rods are disposed on the same side of one of said axes.

13. A wrist assembly according to claim 10 wherein said first and second control rods are disposed on opposite sides of said first axis and on the same side of said second axis.

14. A wrist assembly according to claim 10 wherein each of said linking sections of said first and second control rod members is adapted to rotate about its longitudinal centerline relative to said support member.

* * * * *